(12) United States Patent
Yenna

(10) Patent No.: US 12,066,967 B2
(45) Date of Patent: Aug. 20, 2024

(54) LOGICAL MESSAGE INTERFACE FOR CONFIGURING AND MANAGING A PHYSICAL DEVICE IN SINGLE AND MULTI-HOST SYSTEMS

(71) Applicant: AVAGO TECHNOLOGIES INTERNATIONAL SALES PTE. LIMITED, Singapore (SG)

(72) Inventor: Sathish Kumar Reddy Yenna, Austin, TX (US)

(73) Assignee: Avago Technologies International Sales Pte. Limited, Singapore (SG)

(*) Notice: Subject to any disclaimer, the term of this patent is extended or adjusted under 35 U.S.C. 154(b) by 69 days.

(21) Appl. No.: 17/588,675

(22) Filed: Jan. 31, 2022

(65) Prior Publication Data
US 2023/0244625 A1 Aug. 3, 2023

(51) Int. Cl.
G06F 21/00 (2013.01)
G06F 13/40 (2006.01)
G06F 13/42 (2006.01)

(52) U.S. Cl.
CPC .. G06F 13/4068 (2013.01); *G06F 2213/0016* (2013.01)

(58) Field of Classification Search
None
See application file for complete search history.

(56) References Cited

U.S. PATENT DOCUMENTS

| | | | |
|---|---|---|---|
| 9,866,425 B1* | 1/2018 | Lo | H04L 69/323 |
| 2014/0250328 A1* | 9/2014 | Schnizler | G01R 31/31908 |
| | | | 714/31 |
| 2015/0249620 A1* | 9/2015 | Folsom | H04L 49/90 |
| | | | 370/392 |
| 2016/0087900 A1* | 3/2016 | Kolmanic | H04L 7/0012 |
| | | | 370/235.1 |
| 2016/0124499 A1* | 5/2016 | Shiu | H04L 51/224 |
| | | | 345/173 |
| 2019/0036649 A1* | 1/2019 | Kim | H04L 1/0072 |
| 2019/0149475 A1* | 5/2019 | Martin | H04L 47/24 |
| | | | 370/235 |
| 2019/0370205 A1* | 12/2019 | Pelletier | G06F 13/105 |
| 2019/0391944 A1* | 12/2019 | Seiler | G06K 19/07732 |
| 2022/0021610 A1* | 1/2022 | Kreger-Stickles | H04L 61/103 |
| 2023/0096944 A1* | 3/2023 | Priyanto | H04W 72/21 |
| | | | 370/329 |
| 2023/0098298 A1* | 3/2023 | Kasichainula | H04L 1/0043 |
| | | | 370/329 |
| 2024/0039224 A1* | 2/2024 | Torres | H04L 69/08 |

* cited by examiner

*Primary Examiner* — Hyun Nam
(74) *Attorney, Agent, or Firm* — Foley & Lardner LLP

(57) ABSTRACT

Systems and methods of communicating in a network use a physical device. The physical device includes hardware including a management data input/output interface and firmware configured to cause the hardware to provide a logical message interface using the management data input/output interface. The logical message interface is used to receive messages for configuring and/or managing the physical device.

25 Claims, 8 Drawing Sheets

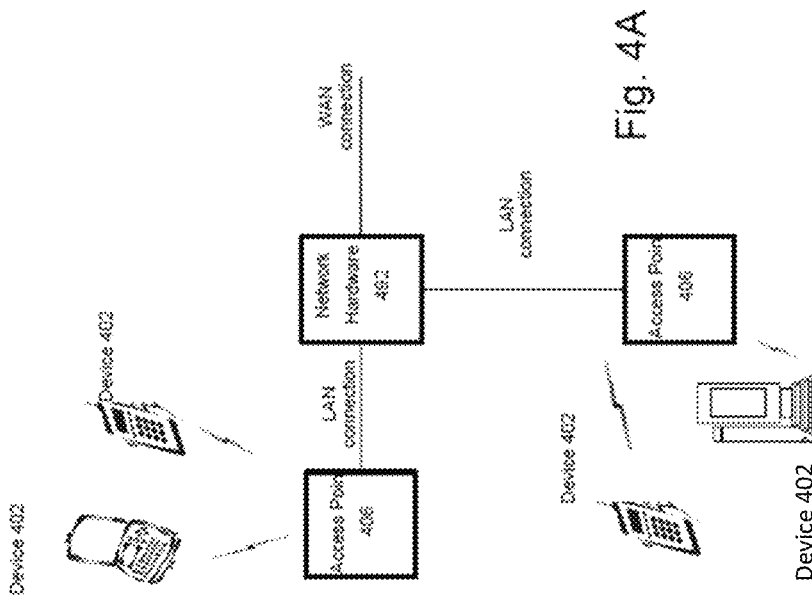

LOGICAL MESSAGE INTERFACE FOR CONFIGURING AND MANAGING A PHYSICAL DEVICE IN SINGLE AND MULTI-HOST SYSTEMS

This disclosure generally relates to network communications. Some embodiments of the present disclosure are related to systems for and methods of configuring and/or managing physical devices in networks.

BACKGROUND OF THE DISCLOSURE

In the last few decades, the market for network communications devices has grown by orders of magnitude, fueled by the use of portable devices, and increased connectivity and data transfer between all manners of devices. Digital switching techniques have facilitated the large scale deployment of affordable, easy-to-use communication networks. Networks include nodes that include physical devices or circuits (PHYs) for providing signals containing data on a physical medium.

PHYs perform physical layer functionality according to standards such as the Ethernet standards. For example, Ethernet PHYs can communicate across various physical mediums such as coaxial cable, twisted pair and optical fiber. In general, network protocol stack software works similarly on all PHYs and is complemented by the media access control (MAC) layer devices or circuits and the logical link layer devices or circuits.

PHYs are managed and/or configured using a Management Data Input/Output (MDIO) interface. Ethernet PHYs are configured and managed by accessing hardware registers directly using the MDIO interface. The MDIO interface serves as a management interface used to read and write the control and status registers of the PHY to configure each PHY before operation and to monitor link status during operation. The MDIO interface for Ethernet PHYs is a 2-wire bus (e.g., a serial bus) defined according to the Ethernet family of IEEE 802.3 standards for the Media Independent Interface (MII) or Serial Management Interface (SMI). According to clause 45 in the IEEE 802.3 specification, the MDIO interface allows a host machine to access up to 65536 registers in a given PHY. Configuring or managing the PHYs using the MDIO interface can require many hundreds of MDIO transactions which can be inefficient, especially in systems/application where multiple PHYs (up to 32) are managed by a single host machine.

BRIEF DESCRIPTION OF THE DRAWINGS

Various objects, aspects, features, and advantages of some embodiments in the specification will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 4A is a block diagram depicting an embodiment of a network environment including one or more access points in communication with one or more devices or stations.

Figure 1:
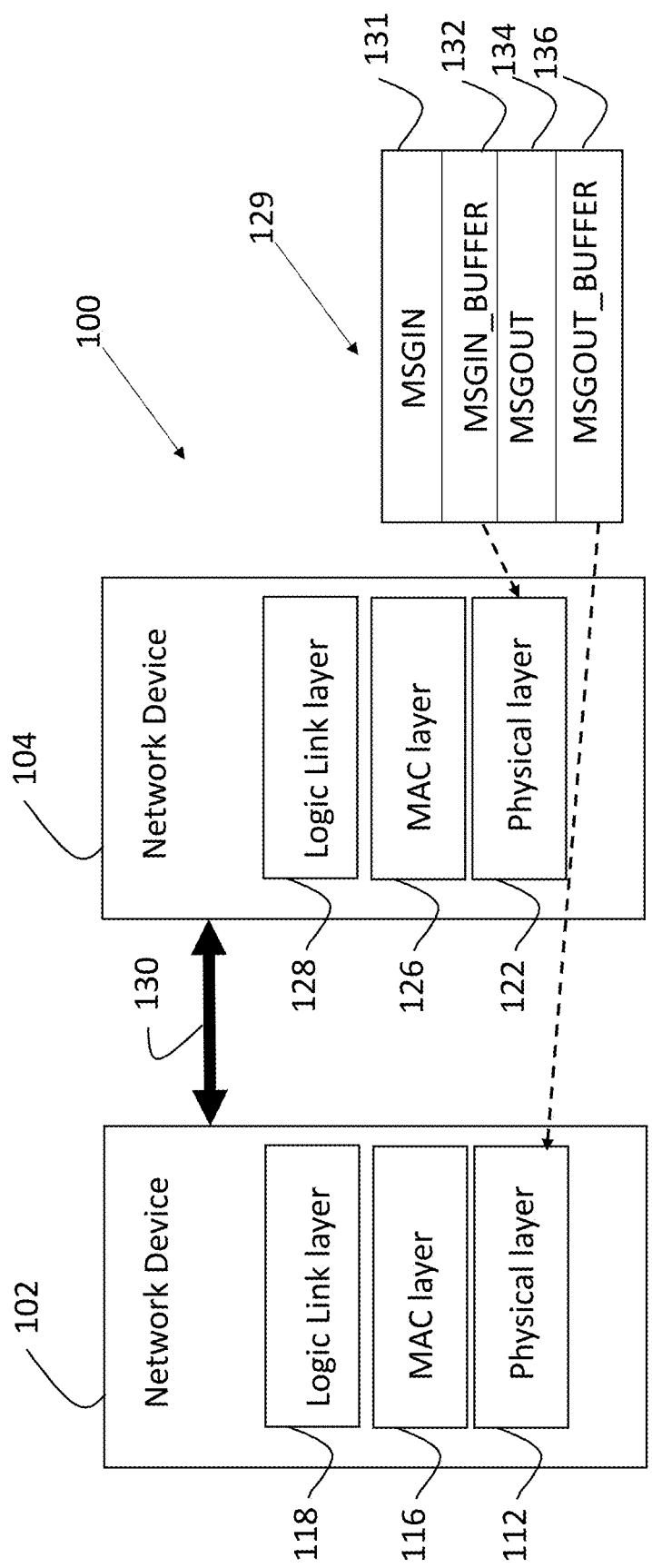
FIG. 1 is a block diagram of a network including network devices in accordance with some embodiments.

The details of various embodiments of the methods and systems are set forth in the accompanying drawings and the description below.

DETAILED DESCRIPTION OF EMBODIMENTS

The following IEEE standard(s), including any draft versions of such standard(s), are hereby incorporated herein by reference in their entirety and are made part of the present disclosure for all purposes IEEE 802.3, IEEE 802.11x, IEEE 802.11ad, IEEE 802.11ah, IEEE 802.11aj, IEEE 802.16 and 802.16a, and IEEE 802.11ac. In addition, although this disclosure may reference aspects of these standard(s), the disclosure is in no way limited by these standard(s).

Some embodiments of the systems and methods described herein provide MDIO transactions with more efficiency, in a less hardware centric fashion, and with less complexity from a host system point of view. In some embodiments, the systems and methods are used in complex Gigabit PHYs and communication systems that use multiple PHYs (e.g., up to 32) managed by a single host machine or multiple host machines. In some embodiments, a message interface implemented in firmware and executed on a microprocessor on the PHY makes configuration and management of the PHY less complex for the host system. The message interface advantageously serves to decouple the hardware of the PHY from the host software by hiding hardware complexity behind the message interface.

In some embodiments, the message interface is a logical interface that supports multiple logical functions and/or operations. The message interface can be generic in nature which makes the message interface portable and easy to manage from one generation to the next, thereby reducing the time to market of any new PHY (e.g., new Ethernet PHY). The message interface supports an unlimited number of registers inside the PHY in some embodiments.

The message interface reduces the complexity associated with the PHYs interacting with host software and customer application code in some embodiments. In some embodiments, the message interface provides a logical interface without requiring complex details about a hardware interface and/or implementation. The systems for and method of configuring and managing a PHY reduce the code size of the host software because the configuration of the PHY for a given mode of operation requires sending only a few messages in some embodiments.

Some embodiments relate to a method of configuring or managing a physical device. The method includes communicating a first message between a physical device and a first host using a first instance of a logical communication interface. The first instance uses a management data input/ output interface. The method also includes communicating a second message to or from the physical device using a second instance of the logical communication interface.

In some embodiments, a message interface for the method is implemented in such a way that there can be multiple instances at a time. Each instance is a single occurrence of the message interface in some embodiments. In some embodiments, the second message is provided to or from a second host. In some embodiments, the second instance uses the management data input/output interface. In some embodiments, the second instance uses a hardware interface. In some embodiments, the hardware interface is an inter-integrated circuit (I2C) interface. In some embodiments, the hardware interface is another management data input/output interface.

In some embodiments, the second message is provided to or from the first host. In some embodiments, the second instance uses a hardware interface.

Some embodiments relate to a physical device for use in a computer network. The physical device includes hardware including a management data input/output interface and firmware configured to cause the hardware to provide a logical message interface using the management data input/output interface. The logical message interface is used to receive a write media access control security message to write a key to a register or an update message to update time of the day of a precision time protocol channel.

In some embodiments, the write media access control security message is received and includes an operation and a length. In some embodiments, the write media access control security message includes parameters. In some embodiments, the parameters include a channel number, a key number, or the key.

In some embodiments, the update message is received and includes an operation and a length. In some embodiments, the update message includes parameters. In some embodiments, the parameters include a precision time protocol channel number or the time of day.

In some embodiments, a network system includes a first host and a physical layer device. The physical layer device is coupled to the host by a management data input/output interface. The physical layer device includes firmware and hardware configured to provide a message interface having instances for communicating messages between the host and the physical layer device. At least one of the instances uses the management data input/output interface. The messages are for configuring or managing the physical device.

In some embodiments, the messages include a write media access control security message to write a key to a register, an update message to update time of the day of a precision time protocol channel, a configure device message to configure physical layer device settings, a configure lane message to configure lane settings, or a configure port message to configure a port with a given set of lanes. In some embodiments, the include comprise a write media access control security message to write a key to a register, an update message to update time of the day of a precision time protocol channel, a configure device message to configure physical layer device settings, a configure lane message to configure lane settings, and a configure port message to configure a port with a given set of lanes.

In some embodiments, the network system also includes a second host, and the instances include a first instance for the first host and a second instance for the second host. In some embodiments, the first instance and the second instance are provided using the management data input/output interface. In some embodiments, the first instance is provided using a second hardware interface to the first host, and the second instance is provided using the management data input/output interface.

In some embodiments, the instances comprise a first instance for the first host and a second instance for the first host. The second instance is provided using a second hardware interface, and the first instance is provided using the management data input/output interface.

For purposes of reading the description of the various embodiments below, the following descriptions of the sections of the specification and their respective contents may be helpful:

Section A describes embodiments of systems of and methods for providing a logical message interface for configuring and/or managing a PHY in single and multi-host systems; and Section B describes a network environment and computing environment which may be useful for practicing embodiments described herein.

Although arrows are shown in the FIGS. as single ended arrows, the flow of data is bi-directional and links represented as single ended arrows can be for read and write operations in some embodiments.

A. Logical Message Interface for Configuring and/or Managing a PHY in Single and Multi-Host Systems FIG. 1 is a block diagram of an implementation of a network 100 including a network device 102 and a network device 104. In some embodiments, network 100 is an electronic, optical or other network. Network 100 can be an electrically wired or optical network interface operating according to an Ethernet standards (10BASE-T, 100BASE-TX, and 1000BASE-T and optical variants) in some embodiments. Data can be communicated at various rates and formats on network 100 including a 100 Gigabits per second (Gb/s) or 400 Gb/s rate communicating packets or frames. In some embodiments, networks devices 102 and 104 communicate across a physical medium 130 which can be a coaxial cable, a twisted pair (e.g., two wire, four wire, single pair Ethernet (SPE)) or an optical fiber. In some embodiments, the physical medium 130 is a wireless transmission medium.

Network devices 102 and 104 communicate via the physical medium 130. Network devices 102 and 104 may operate in conjunction with system software (e.g., a network driver, OS kernel, etc.) running on a processor, to send or receive packets (e.g., Ethernet packets), as discussed in more detail below in connection with FIGS. 4A-C. Network devices 102 and 104 are Ethernet devices in some embodiments. Network device 102 includes a logic link layer 118, a MAC layer 116, and PHY 112. Network device 104 includes a logic link layer 128, a MAC layer 126, and PHY 122.

Logic link layers 118 and 128 acts as an interface between the media access control (MAC) layers 116 and 126, respectively, and a network layer. Logic link layers 118 and 128 control multiplexing and de-multiplexing protocols transmitted over the MAC layers 116 and 126 and can also provide node-to-node flow control and error management. The MAC layers 116 and 126 control the PHYs 112 and 122 which are responsible for interaction with the transmission or physical medium 130.

The MAC layers 116 and 126 and the logic link layers 118 and 128 together make up a data link layer in some embodiments. The data link layer part of an eight-layer open system interconnection (OSI) model in some embodiments. In some embodiments, PHYs 112 and 122 are configured to provide a logical message interface for MDIO transactions. The MAC layers 116 and 126 include a media access controller and can communicate with the PHYs 112 and 122, respectively, via the logical message interface in some embodiments. The logical message interface is an input/output configuration or software entity for sending and receiving messages that include commands or other operations. The logical message interface is a virtual interface that is software-based or firmware-based in some embodiments. In some embodiments, the properties of the logical message interface have characteristics that do not apply to the physical interface (e.g., the MDIO interface). In some embodiments, the logical message interface receives messages in a register structure and those messages are processed by firmware or software executed on hardware in the PHYs 112 and 122 to provide an operation. In some embodiments, the operation involves obtaining and transmitting information to the MAC layers 116 and 122 in response to the message and/or obtaining information from the MAC layers 116 and 112 and configuring the PHYs 112 and 122 using that information in response to the message. The logical message interface can utilize the MDIO hardware structure to communicate the messages.

PHYs 112 and 122 include a networking protocol sublayer that provides an interface between a physical medium attachment sublayer and a reconciliation sublayer. The physical coding sublayer takes data from MAC layers 116 and 126 and encodes it for communication across the physical medium 130 in some embodiments. PHYs 112 and 122 provide encoding/decoding, scrambling/descrambling, alignment marker insertion/removal, block and symbol redistribution, lane block synchronization and de-skew in some embodiments. PHYs 112 and 122 also perform PMA framing, octet synchronization/detection, scrambling/descrambling, and other functions. PHYs 112 and 122 provide multiplexing and de-multiplexing operations in some embodiments. PHYs 112 and 122 define the details of transmission and reception of individual bits on a physical medium 130 (including but not limited to bit timing, signal encoding, interacting with the physical medium, and the properties of the cable, optical fiber, or wire itself) in some embodiments. PHYs 112 and 122 provide symbols representing data that can be any of a variety of formats suitable for network communications in some embodiments. PHYs 112 and 122 include a set of transmitters and receivers for transmitting and receiving the symbols on the physical medium 130.

In some embodiments, PHYs 112 and 122 are configured to provide a logical message interface for MDIO transactions. 112 and 122 can each include a set 129 of registers or other storage devices for implementing the logical message interface as explained below. Set 129 of registers include a message in (MSGIN) register 131, a MSGIN buffer 132 (e.g., a set of registers to send the message parameters), a message out (MSGOUT) register 134, and a MSGOUT_BUFFER 136 (e.g., a set of registers to send the message result).

Figure 2A:
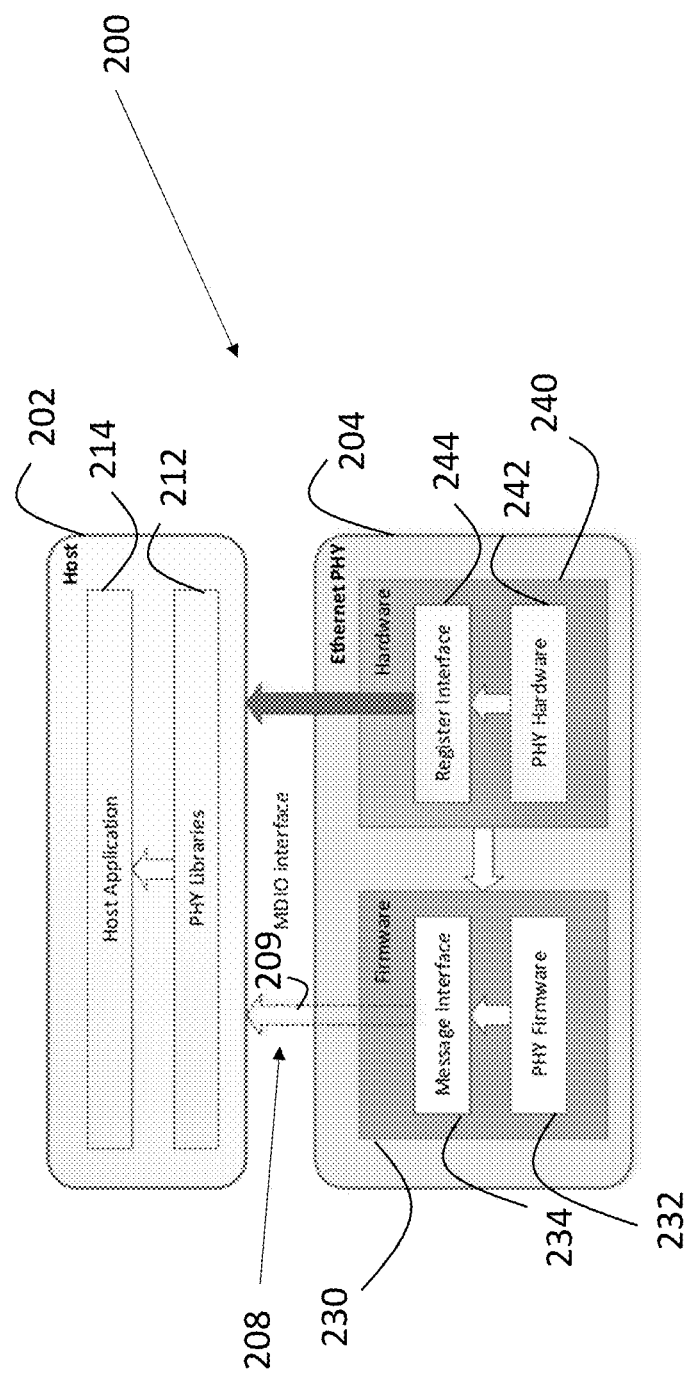
FIG. 2A is a more detailed block diagram of a system including a PHY and a single host system coupled together by an MDIO interface in accordance with some embodiments.

With reference to FIG. 2A, a system 200 includes a host system 202 and a PHY 204. PHY 204 is coupled to host system 202 by an MDIO interface 208. PHY 204 is configured to provide a logical message interface that uses MDIO interface 208.

Host system 202 is a computer, server, central processing unit, workstation, or other processing device. In some embodiments, host system 202 is a MAC layer or is provided with a MAC layer. Host system 202 can be provided on the same integrated circuit (IC) or device as PHY 204. Host system 202 includes a host application 214 and PHY libraries 212.

PHY libraries 212 can be stored in a memory, database or other storage device on host system. Host application 214 is software for implementing applications performed by host system 202. Host application 214 can be any of various communication, computing, entertainment, or other applications. PHY libraries 212 are software libraries and include software for configuring PHY 204. Host application 214 can use software in PHY libraries 212 to configured PHY 204. In some embodiments, the size of PHY libraries 212 can be significantly reduced because the complexity of hardware configuration is reduced when a logical message interface is used as described below.

PHY 204 can be one of PHYs 112 and 122 (FIG. 1). PHY 204 includes firmware 230 and hardware 240. Firmware 230 includes PHY firmware 232 and a message interface 234. Firmware 230 and/or PHY firmware 232 includes software instructions for implementing message interface 234 for an instance 209 in some embodiments. The message interface 234 is a logical message interface implemented in the firmware 230. The message interface 234 is configured to interact with register interface 244 to communicate the messages over MDIO interface 208 and provide the operations as described below in some embodiments.

Hardware 240 includes register interface 244 and PHY hardware 242. Hardware 240 includes circuitry configured for physical layer networking operations including configuration and management using message interface 234. The circuitry can be configured by data in registers, memory, or other storage and can work with software (e.g., in PHY firmware 232) instructed processors to perform a network operation. Examples of hardware include central processing units, signal processors, dedicated circuits, ASICS, programmable logic devices, non-programmable logic devices, arithmetic logic units, counters, storage (e.g., memory and registers), combinations thereof, etc.

Hardware 240 includes a central processing unit for executing PHY firmware 232 in some embodiments. In some embodiments, hardware 240 includes an advanced microprocessor. The advanced microprocessor executes the firmware 230 and/or the PHY firmware 232 to provide the message interface 234 which simplifies the configuration and management of PHY 204 for host system 202.

Register interface 244 provides read and write access to registers (e.g., set 129 of registers in FIG. 1) in PHY hardware 242. The register interface 244 uses registers associated with hardware 240 and/or PHY hardware 242 to communicate the messages and perform operations as described below.

PHY hardware 242 is part of hardware 240 and manages the register interface 244. PHY hardware 242 includes dedicated circuits, ASICS, programmable logic devices, non-programmable logic devices, arithmetic logic units, counters, storage (e.g., memory and registers), combinations thereof, etc.

Register interface 244 is coupled to host system 202 via MDIO interface 208. MDIO interface 208 is a physical interface (e.g., a 2 wire serial interface). The MDIO interface 208 is used to communicate an MDIO interface clock (MDC) signal driven by a MAC device (e.g., MAC layer 126 in FIG. 1) to PHY 204. The MDIO interface 208 is also used to bi-directionally communicate register data for the PHY 204. Message interface 234 is virtually connected to host system 202 using instance 209 via the MDIO interface 208.

PHY 204 operating according to firmware 230 supports a defined set of messages, which reduces the complexity of host software of host system 202. In some embodiments, MDIO interface 208 is relatively slow and can be a bottleneck when configuring PHY 204 (e.g., an advanced PHY device or IC). Message interface 234 using the defined set of messages reduces the number of transactions for configuring PHY 204. In some embodiments, PHY 204 can be configured by information in several MDIO transactions by using the defined set of messages.

PHY 204 operating according to firmware 230 is not limited to using a register address in an MDIO interface frame (according to IEEE standard 802.3, Clause 45) which is a 16-bit field that puts an upper limit on the number of registers at 65536. Message interface 234 advantageously avoids this limit by using a message to access registers indirectly through register interface 244 and firmware 230 in some embodiments. A complex hardware interface to allow indirect access to registers over MDIO interface 208 beyond the allowed 65536 registers is not required in some embodiments.

A message communicated using message interface 234 has the following fields: a message header and message body. The message header includes a message identifier and operation information in some embodiments. The operation information includes information about an internal resource and an operation to be performed on the internal resource. The message body includes message length followed by parameters and/or operands needed to complete the operation. An exemplary message communicated using message interface 234 can be provided in a packet and can be represented as follows:

MessageID.Operation.Length.Parameters.

To implement the message interface 234 using PHY 204, PHY 204 provides the following direct access registers over the MDIO interface 208: message in (MSGIN) register 131, MSGIN buffer 132 (e.g., a set of registers to send the message parameters), message out (MSGOUT) register 134, and MSGOUT buffer 136 (e.g., a set of registers to send the message result). See FIG. 1. The set 129 of registers are in PHY hardware 242 and are accessible via the register interface 244. The host system 202 writes the MSGIN_BUFFER with the parameters followed by a write to the MSGIN register in a message to the PHY 204 over MDIO interface 208. PHY firmware 232 reads the sent message, executes the requested operation, and finally responds by writing to the MSGOUT buffer 136 with the return data (if any) and the MSGOUT register 134 with the result of the operation. The required number of registers for MSGIN buffer 132 and MSGOUT buffer 136 depends on the maximum amount of data passed as part of a single message and can be set using configuration data. In some embodiments, the same set of registers for both for MSGIN buffer 132 and MSGOUT buffer 136 can be utilized.

Exemplary messages using message interface 234 are provided below.
1. A configure PHY message is used to configure PHY settings (e.g., CONFIG_PHY.WRITE/READ.LEN.Parameters—example parameters include reference clock speed, and any PHY level settings).
2. A configure lane message is used to configure lane settings (e.g., CONFIG_LANES.WRITE/READ.LEN.Paramters—example parameters include lane re-map and polarity swap configuration for lanes of the PHY 204).
3. A configure port message is used to configure a port with a given set of lanes (e.g., CONFIG_PORT.WRITE/READ.LEN.Parameters—example parameters include port number, lanes used to form the port and order of the lanes within the port etc.).
4. An enable message is used to enable a configured port in a given mode of operation (e.g., ENABLE_PORT.START/START_RESULT.LEN.Parameters—example parameters include the port mode, port speed, and any required port settings).
5. A disable message is used to disable an already enabled port (e.g., DISABLE_PORT.START/START_RESULT.LEN.Parameters—example parameters include the port number to disable).
6. A write MAC security (MACsec) message is used to write a MACsec key (e.g., MACSEC_KEY.WRITE.LEN.Parameters—example parameters include MACsec channel number, key number and the key).
7. An update message is used to update time of day (TOD) of a precision time protocol (PTP) channel (e.g., PTP_TOD.WRITE.LEN.Parameters—example parameters include PTP channel number and the TOD parameters).

Exemplary individual operation(s) supported for the exemplary messages are provided below:
1. A read/write operation (WRITE/READ) provides write/read access to a given setting/parameter over message interface 234.
2. A start operation (START) starts a method in the PHY firmware 232, which might take a long time for PHY firmware 232 to complete.
3. A start result operation (START_RESULT) operation retrieves the status of an already started method. This approach frees up the message interface 234 immediately after initiating the method. The message interface 234 is available for the user while the PHY firmware 232 works on the requested method.
4. A success error operation (SUCCESS/ERROR) is a response from the PHY firmware 232 for the above operations with corresponding return data.

The messages and operations as handled in firmware 230 reduce the complexity of hardware 240 and allow new modes of operation and new functionality to be provided using the message interface 234. New messages can be added with no effect on existing messages, reducing the implementation and validation times. Specific messages can be implemented over message interface 234 to provide access to all the registers and memories in hardware 240 and PHY hardware 242. Such access provides a complete view of the hardware 240 and PHY hardware 242 and reduces time for debugging complex hardware related bugs and other issues.

Figure 2B:
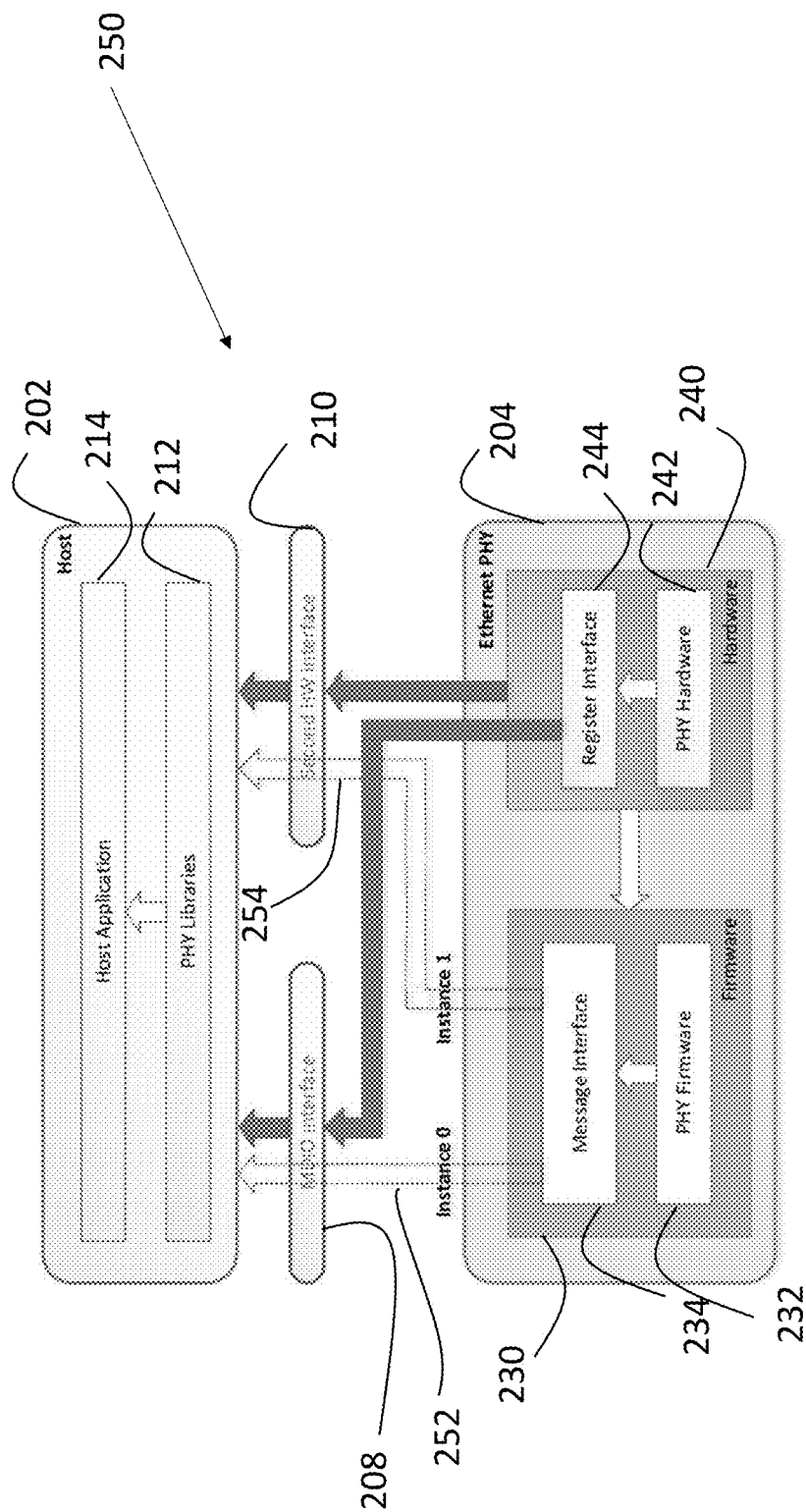
FIG. 2B is a more detailed block diagram of a system including a PHY and single host system coupled together by an MDIO interface and a second interface in accordance with some embodiments.

With reference to FIG. 2B, a system 250 includes a host system 202 and PHY 204. PHY 204 is coupled to host system 202 by MDIO interface 208 and a hardware interface 210. PHY 204 is configured to have a logical message interface that uses MDIO interface 208 and hardware interface 210. System 250 is a single host system with two independent hardware interfaces (e.g., MDIO interface 208 and a hardware interface 210). The logical message interface uses MDIO interface 208 and a hardware interface 210 to configure and manage PHY 204.

Hardware interface 210 is an MDIO interface, inter-integrated circuit (I2C) interface (e.g., for serial communication), a short distance communication interface, or other hardware interface. Host system 202 is configured to implement two processes or threads. The processes or threads are implemented using host application 214 and PHY libraries 212 in some embodiments. The processes or threads are dedicated for a particular functionality—one for configuration and management and another for a specific process-intensive functionality like MAC security (MACsec), precision time protocol (PTP) management, or other network operation. Each process/thread has its own dedicated hardware interface of MDIO interface 208 and a hardware interface 210 and a dedicated instance of instances 252 and 254 of message interface 234 in some embodiments. Advantageously, a mutual exclusion between the two processes/threads is not required in some embodiments.

Figure 3A:
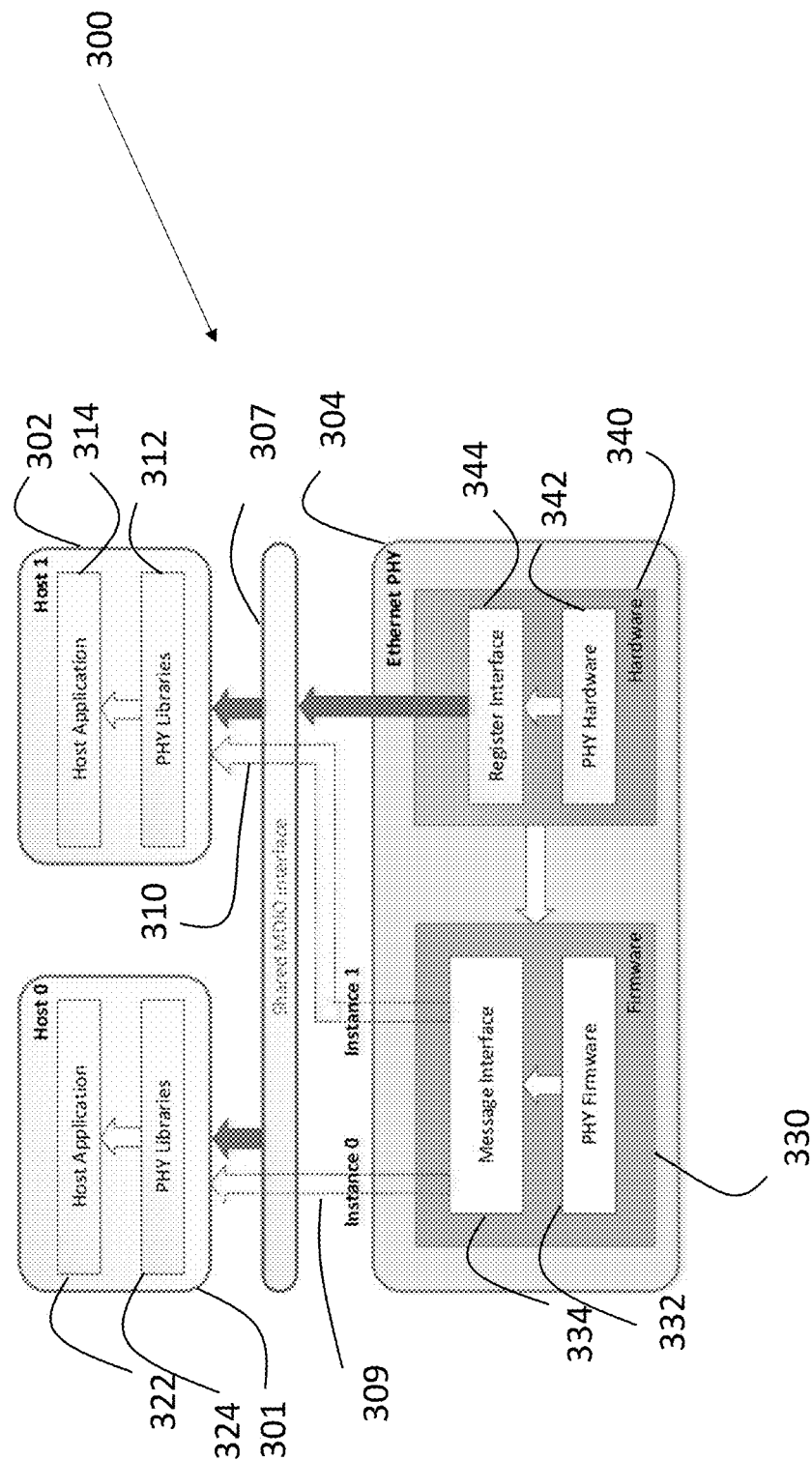
FIG. 3A is a more detailed block diagram of a system including a PHY and two host systems coupled together by a shared MDIO interface in accordance with some embodiments.

With reference to FIG. 3A, a system 300 includes a host system 301, a host system 302 and PHY 304. PHY 304 is coupled to host system 301 and host system 302 by a shared MDIO interface 307. PHY 304 is configured to have a message interface 334 (a logical message interface) that uses shared MDIO interface 307. Host system 301 includes a host application 322 and PHY libraries 324. Host system 302 includes a host application 314 and PHY libraries 312. Host applications 322 and 314 and PHY libraries 324 and 312 are similar to host application 214 (FIG. 2A) and PHY libraries 212 (FIG. 2A), respectively.

PHY 304 is similar to PHY 204 (FIGS. 2A-B). PHY 304 can be one of PHYs 112 and 122 (FIG. 1). PHY 304 includes firmware 330 and hardware 340. Hardware 340 includes register interface 344 and PHY hardware 342 which are similar to register interface 244 and PHY hardware 242 (FIGS. 2A-B). Hardware 340 is similar to hardware 240 (FIGS. 2A-B).

Firmware 330 includes PHY firmware 332 and a message interface 334. Firmware 330 and/or PHY firmware 332 includes software instructions for implementing message interface 334 which supports instances 309 and 310 in some embodiments. The message interface 334 is a logical message interface implemented in the PHY firmware 332 in some embodiments. The message interface 334 is configured to interact with register interface 344 to communicate the messages over shared MDIO interface 307 and perform operations as described herein in some embodiments.

System 300 is a dual host system with a single hardware interface (e.g., shared MDIO interface 307). The logical message interface uses shared MDIO interface 307 to configure and manage PHY 304. Instances 309 and 310 of the message interface 334 are supported over a physical interfaces such as shared MDIO interface 307. For example, PHY firmware 332 may support instances 309 and 310 of message interface 334 over shared MDIO interface 307 with host systems 301 and 302, respectively.

In some embodiments, each of host systems 301 and 302 is dedicated for a particular functionality (e.g., one for configuration and management and another for a specific process-intensive functionality like PTP management, etc.). Extra hardware for mutual exclusion between host systems 301 and 302 is not needed as each instance 309 and 310 operates independently. Although two host systems 301 and 302 and two instances 309 and 310 are shown, three or more instances and host systems can use shared MDIO interface 307 to communicate with PHY 304.

Figure 3B:
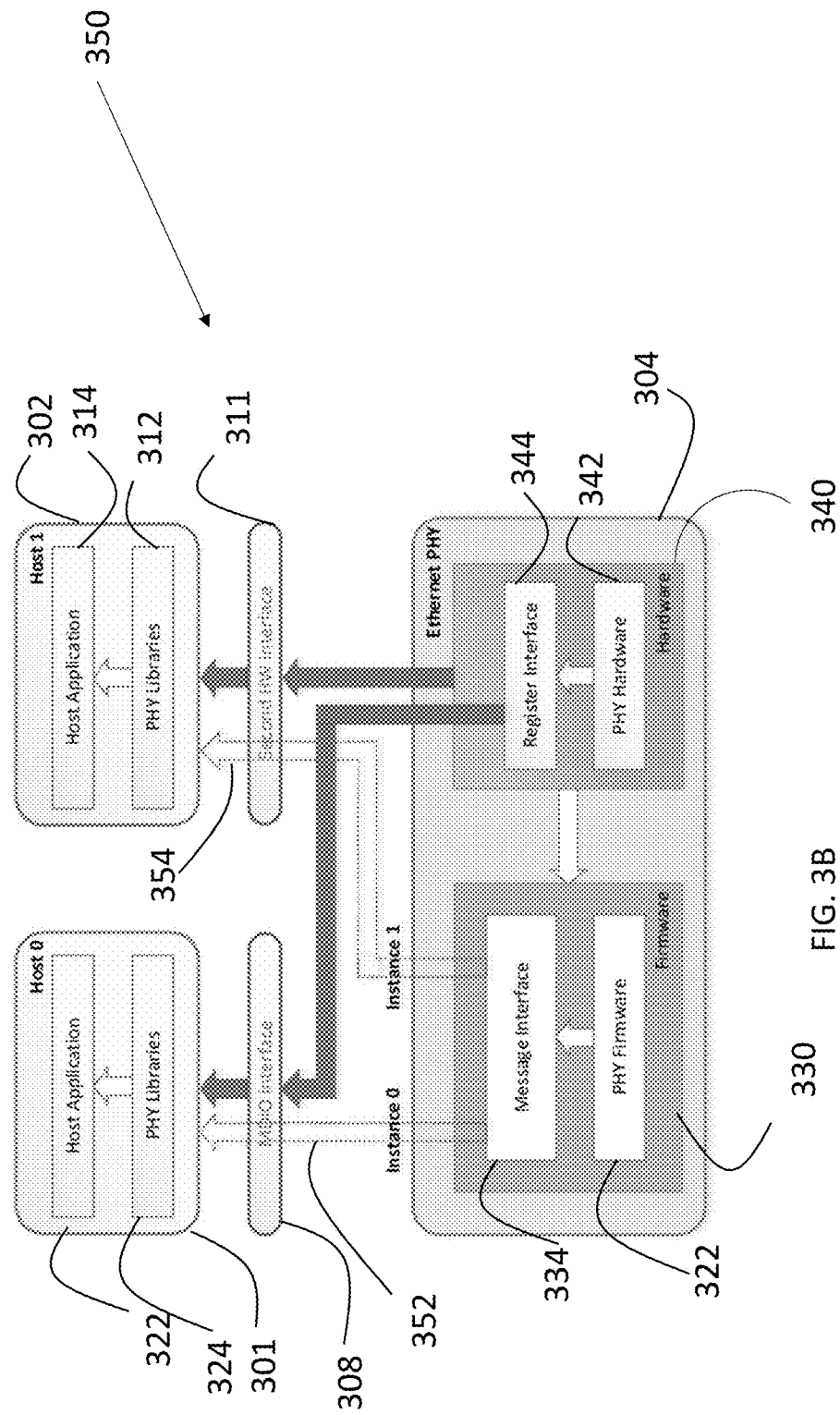
FIG. 3B is a more detailed block diagram of a system including a PHY and two host systems coupled together by an MDIO interface and a second interface in accordance with some embodiments.

With reference to FIG. 3B, a system 350 includes host system 301, host system 302 and PHY 304. PHY 304 is coupled to host system 301 by a MDIO interface 308, and PHY 304 is coupled to host system 302 by second hardware interface 311. PHY 304 is configured to have message interface 334 as a logical message interface that uses MDIO interface 308 and second hardware interface 311.

Hardware interface 311 is an MDIO interface, inter-integrated circuit (I2C) interface (e.g., for serial communication), a short distance communication interface, or other hardware interface. Host systems 301 and 302 are configured to implement two processes or threads. The processes or threads are dedicated for a particular functionality—one for configuration and management and another for a specific process-intensive functionality like MACs security (MACsec), precision time protocol (PTP) management, or other network operation. In some embodiments, one of host systems 301 and 302 is dedicated to configuring and managing Ethernet ports, and another of the host systems 301 and 302 includes a field programmable gate array (FPGA) ASIC, or other circuit for managing MACsec and/or PTP channels, which require higher communication performance with the PHY 304. Each process/thread uses its own dedicated hardware interface of MDIO interface 308 and hardware interface 311 and a dedicated instance of instances 352 and 354 in some embodiments. Advantageously, a mutual exclusion between the two processes/threads and associated hardware is not required in some embodiments. Although two host systems 301 and 302 and two instances 352 and 354 are shown, three or more instances and host systems can use shared interfaces or three or more separate interfaces to communicate with PHY 304.

B. Computing and Network Environment

Figure 4B:
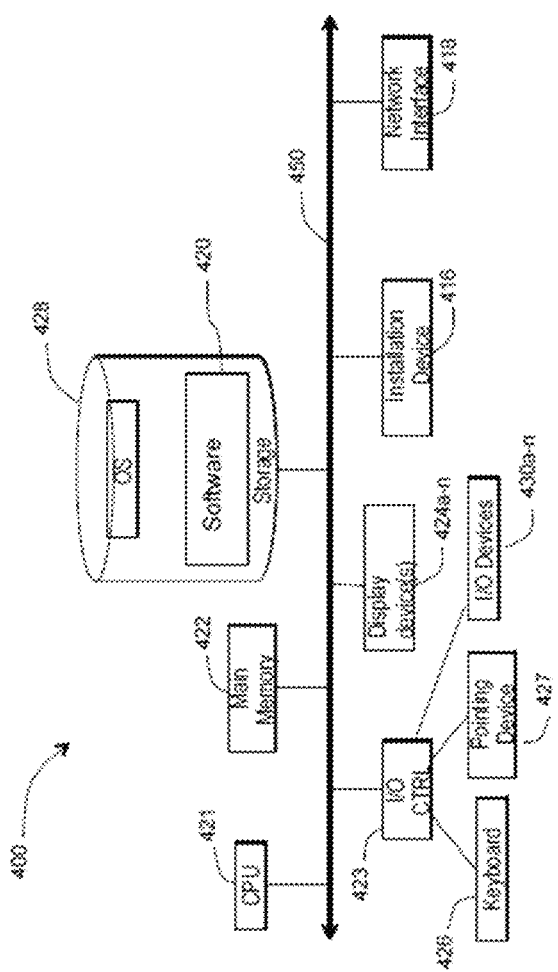
FIGS. 4B and 4C are block diagrams depicting embodiments of computing devices useful in connection with the methods and systems described herein.

Having discussed some embodiments of a logical message interface for PHYs, it may be helpful to describe aspects of the operating environment as well as associated system components (e.g., hardware elements) in connection with the methods and systems described herein. Referring to FIG. 4A, an embodiment of a network environment is depicted. The network environment can include network 100 (FIG. 1) and PHYs 204 (FIGS. 2A-B) and 304 (FIGS. 3A-B). In brief overview, the network environment includes wired devices, e.g., a laptop connected via a standard Ethernet cable, and a wireless communication system that includes one or more access points 406, one or more wireless communication devices 402 and a network hardware component 492. The wireless communication devices 402 may for example include laptop computers 402, tablets 402, personal computers 402 and/or cellular telephone devices 402. The details of an embodiment of each wireless communication device and/or access point are described in greater detail with reference to FIGS. 4B and 4C. The network environment can be an ad hoc network environment, an infrastructure wireless network environment, a subnet environment, etc. in one embodiment.

The access points (APs) 406 may be operably coupled to the network hardware 492 via local area network connections. The network hardware 492 (e.g., network devices 102 and 104 (FIG. 1)), which may include a router, gateway, switch, bridge, modem, system controller, appliance, etc., may provide a local area network connection for the communication system. Each of the access points 406 may have an associated antenna or an antenna array to communicate with the wireless communication devices 402 in its area via wireless local area network connections. The wireless communication devices 402 may register with a particular access point 406 to receive services from the communication system (e.g., via a SU-MIMO or MU-MIMO configuration). For direct connections (e.g., point-to-point communications), some wireless communication devices 402 may communicate directly via an allocated channel and communications protocol. Some of the wireless communication devices 402 may be mobile or relatively static with respect to the access point 406.

An access point 406 may connect to a router (e.g., via a wired network) as a standalone device in some embodiments. In other embodiments, an access point can be a component of a router. An access point 406 can provide multiple devices 402 access to a network. An access point 406 may, for example, connect to a wired Ethernet connection and provide wireless connections using radio frequency links for other devices 402 to utilize that wired connection.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 4C:
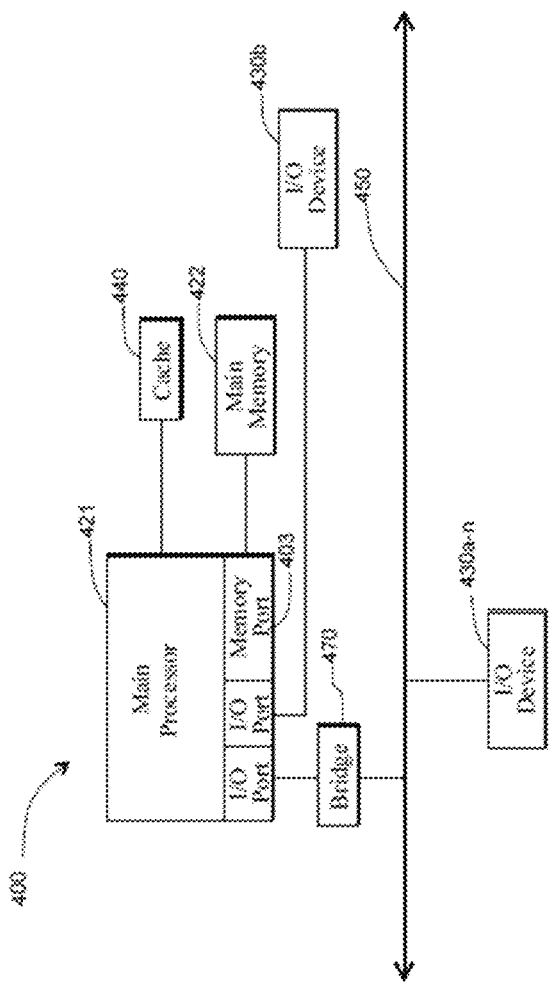

The communications device(s) 402 and access point(s) 406 may be deployed as and/or executed on any type and form of computing device, such as a computer, network device or appliance capable of communicating on any type and form of network and performing the operations described herein. FIGS. 4B and 4C depict block diagrams of a computing device 400 useful for practicing an embodiment of the wireless communication devices 402 or the access point 406. As shown in FIGS. 4B and 4C, each computing device 400 includes a central processing unit 421, and a main memory unit 422. As shown in FIG. 4B, a computing device 400 may include a storage device 424, an installation device 416, a network interface 418, an I/O controller 423, display devices 424a-424n, a keyboard 426 and a pointing device 427, such as a mouse. The storage device 428 may include, without limitation, an operating system and/or application software. As shown in FIG. 4C, each computing device 400 may also include additional optional elements, such as a memory port 403, a bridge 470, one or more input/output devices 430a-430n (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 400 may be based on any of these processors, or any other processor capable of operating as described herein.

Main memory unit 422 may be one or more memory chips capable of storing data and allowing any storage location to be directly accessed by the microprocessor 421, such as any type or variant of Static random access memory (SRAM), Dynamic random access memory (DRAM), Ferroelectric RAM (FRAM), NAND Flash, NOR Flash and Solid State Drives (SSD). The main memory 422 may be based on any of the above described memory chips, or any other available memory chips capable of operating as described herein. In the embodiment shown in FIG. 4B, the processor 421 communicates with main memory 422 via a system bus 450 (described in more detail below). FIG. 4C depicts an embodiment of a computing device 400 in which the processor communicates directly with main memory 422 via a memory port 403. For example, in FIG. 4C the main memory 422 may be DRDRAM.

FIG. 4C depicts an embodiment in which the main processor 421 communicates directly with cache memory 440 via a secondary bus, sometimes referred to as a backside bus. In other embodiments, the main processor 421 communicates with cache memory 440 using the system bus 450. Cache memory 440 typically has a faster response time than main memory 422 and is provided by, for example, SRAM, BSRAM, or EDRAM. In the embodiment shown in FIG. 4C, the processor 421 communicates with various I/O devices 430 via a local system bus 450. Various buses may be used to connect the central processing unit 421 to any of the I/O devices 430, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4C depicts an embodiment of a computer or computing device 400 in which the main processor 421 may communicate directly with I/O device 430b, for example via HYPERTRANSPORT, RAPIDIO, or INFINIBAND communications technology. FIG. 4C also depicts an embodiment in which local busses and direct communication are mixed: the processor 421 communicates with I/O device 430a using a local interconnect bus while communicating with I/O device 430b directly.

A wide variety of I/O devices 430a-430n may be present in the computing device 400. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 423 as shown in FIG. 4B. The I/O controller may control one or more I/O devices such as a keyboard 426 and a pointing device 427, e.g., a mouse or optical pen. Furthermore, an I/O device may also provide storage and/or an installation medium or device 416 for the computing device 400. In still other embodiments, the computing device 400 may provide USB connections (not shown) to receive handheld USB storage devices such as the USB Flash Drive line of devices manufactured by Twintech Industry, Inc. of Los Alamitos, Calif.

Referring again to FIG. 4B, the computing device 400 may support any suitable installation device 416, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 400 may further include a storage device, such as one or more hard disk drives or redundant arrays of independent disks, for storing an operating system and other related software, and for storing application software programs such as any program or software 420 for implementing (e.g., configured and/or designed for) the systems and methods described herein. Optionally, any of the installation devices 416 could also be used as the storage device. Additionally, the operating system and the software can be run from a bootable medium.

Furthermore, the computing device 400 may include a network interface 418 to interface to the network 404 through a variety of connections including, but not limited to, standard telephone lines, LAN or WAN links (e.g., 402.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 400 communicates with other computing devices 800' via any type and/or form of gateway or tunneling protocol such as Secure Socket Layer (SSL) or Transport Layer Security (TLS). The network interface 418 may include one of network devices 102 and 104 (FIG. 1) and may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

In some embodiments, the computing device 400 may include or be connected to one or more display devices 424a-424n. As such, any of the I/O devices 430a-430n and/or the I/O controller 423 may include any type and/or form of suitable hardware, software, or combination of hardware and software to support, enable or provide for the connection and use of the display device(s) 424a-424n by the computing device 400. For example, the computing device 400 may include any type and/or form of video adapter, video card, driver, and/or library to interface, communicate, connect or otherwise use the display device(s) 424a-424n. In one embodiment, a video adapter may include multiple connectors to interface to the display device(s) 424a-424n. In other embodiments, the computing device 400 may include multiple video adapters, with each video adapter connected to the display device(s) 424a-424n. In some embodiments, any portion of the operating system of the computing device 400 may be configured for using multiple displays 424a-424n. One ordinarily skilled in the art will recognize and appreciate the various ways and embodiments that a computing device 400 may be configured to have one or more display devices 424a-424n.

In further embodiments, an I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 400 of the sort depicted in FIGS. 4B and 4C may operate under the control of an operating system, which control scheduling of tasks and access to system resources. The computing device 400 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system or computing device 400 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computing device 400 has sufficient processor power and memory capacity to perform the operations described herein.

In some embodiments, the computing device 400 may have different processors, operating systems, and input devices consistent with the device. For example, in one embodiment, the computing device 400 is a smart phone, mobile device, tablet or personal digital assistant. In still other embodiments, the computing device 400 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A physical device for use in a computer network, the physical device comprising:
hardware comprising a management data input/output interface; and
firmware configured to cause the hardware to provide a logical message interface using the management data input/output interface, the logical message interface being used to receive a write media access control security message to write a key to a register or an update message to update time of day of a precision time protocol channel, wherein the write media access control security message is received and comprises an operation and a length, wherein the write media access control security message comprises parameters, wherein the physical device is an ethernet device configured to provide management data input/output transactions.

2. The physical device of claim 1, wherein the parameters comprise a channel number, a key number, or the key.

3. The physical device of claim 1, wherein the update message comprises second parameters.

4. The physical device of claim 1, wherein the hardware comprises an electronic circuit comprising register interface and a physical layer circuit, the register interface being coupled to the physical layer circuit, the physical layer circuit comprising a set of registers, wherein the firmware is configured to execute the operation and write a result of the operation to at least one of the registers.

5. A physical device for use in a computer network, the physical device comprising:
hardware comprising a management data input/output interface; and
firmware configured to cause the hardware to provide a logical message interface using the management data input/output interface, the logical message interface being used to receive a write media access control security message to write a key to a register or an update message to update time of day of a precision time protocol channel, wherein the update message is received and comprises an operation and a length, wherein the update message comprises parameters, wherein the physical device is an ethernet device configured to provide management data input/output transactions.

6. The physical device of claim 5, wherein the write media access control security message is received and comprises a second operation and a second length.

7. The physical device of claim 5, wherein the write media access control security message comprises second parameters.

8. The physical device of claim 5, wherein the parameters comprise precision time protocol channel number or the time of day.

9. The physical device of claim 5, wherein the hardware comprises an electronic circuit comprising register interface and a physical layer circuit, the register interface being coupled to the physical layer circuit, the physical layer circuit comprising a set of registers, wherein the firmware is configured to execute the operation and write a result of the operation to at least one of the registers.

10. A network system, comprising:
a first host; and
a physical layer device coupled to the first host by a management data input/output interface, the physical layer device comprising firmware and hardware configured to provide a message interface having a plurality of instances for communicating messages between the first host and the physical layer device, wherein at least one of the instances uses the management data input/output interface and the messages are for configuring or managing the physical layer device, wherein the messages comprise a write media access control security message to write a key to a register, an update message to update time of day of a precision time protocol channel, a configure device message to configure physical layer device settings, a configure lane message to configure lane settings, or a configure port message to configure a port with a given set of lanes.

11. The network system of claim 10, wherein the physical layer device comprises a register interface and a physical layer circuit, the register interface being coupled to the physical layer circuit, the physical layer circuit comprising a set of registers, wherein the firmware is configured to execute an operation in one of the messages and write a result of the operation to at least one of the registers, wherein the physical layer device is an ethernet device configured to provide management data input/output transactions.

12. A network system, comprising:
a first host;
a physical layer device coupled to the first host by a management data input/output interface, the physical layer device comprising firmware and hardware configured to provide a message interface having a plurality of instances for communicating messages between the first host and the physical layer device, wherein at least one of the instances uses the management data input/output interface and the messages are for configuring or managing the physical layer device; and
a second host, wherein the instances comprise a first instance for the first host and a second instance for the second host.

13. The network system claim 12, wherein the messages comprise a write media access control security message to write a key to a register, an update message to update time of day of a precision time protocol channel, a configure device message to configure physical layer device settings, a configure lane message to configure lane settings, or a configure port message to configure a port with a given set of lanes.

14. The network system claim 12, wherein the messages comprise a write media access control security message to write a key to a register, an update message to update time of day of a precision time protocol channel, a configure device message to configure physical layer device settings, a configure lane message to configure lane settings, and a configure port message to configure a port with a given set of lanes.

15. The network system claim 12, wherein the second instance is provided using a second hardware interface and the first instance is provided using the management data input/output interface, wherein the physical layer device is an ethernet device configured to provide management data input/output transactions.

16. The network system claim 12, wherein a first message between the physical layer device and the first host uses the first instance, the first instance being a logical communication interface, and wherein a second message to or from the physical layer device uses the second instance provided using a second hardware interface and the first instance is provided using the management data input/output interface.

17. The network system of claim 12, wherein the second instance uses a hardware interface.

18. The network system of claim 12, wherein the physical layer device comprises a register interface and a physical layer circuit, the register interface being coupled to the physical layer circuit, the physical layer circuit comprising a set of registers, wherein the firmware is configured to execute an operation in one of the messages and write a result of the operation to at least one of the registers.

19. A network system, comprising:
a first host;
a physical layer device coupled to the first host by a management data input/output interface, the physical layer device comprising firmware and hardware configured to provide a message interface having a plurality of instances for communicating messages between the first host and the physical layer device, wherein at least one of the instances uses the management data input/output interface and the messages are for configuring or managing the physical layer device; and
wherein a first instance and a second instance are provided using the management data input/output interface.

20. The network system claim 19, wherein the second instance uses a hardware interface, wherein the hardware interface comprises an inter-integrated circuit (I2C) interface, wherein the physical layer device is an ethernet device configured to provide management data input/output transactions.

21. The network system claim 20, wherein the hardware interface comprises another management data input/output interface.

22. The network system of claim 19, wherein the messages comprise a write media access control security message to write a key to a register, an update message to update time of day of a precision time protocol channel, a configure device message to configure physical layer device settings, a configure lane message to configure lane settings, or a configure port message to configure a port with a given set of lanes.

23. The network system of claim 19, wherein the physical layer device comprises a register interface and a physical layer circuit, the register interface being coupled to the physical layer circuit, the physical layer circuit comprising a set of registers, wherein the firmware is configured to execute an operation in one of the messages and write a result of the operation to at least one of the registers.

24. A network system, comprising:
a first host;
a physical layer device coupled to the first host by a management data input/output interface, the physical layer device comprising firmware and hardware configured to provide a message interface having a plurality of instances for communicating messages between the first host and the physical layer device, wherein at least one of the instances uses the management data input/output interface and the messages are for configuring or managing the physical layer device; and
wherein the instances comprise a first instance and a second instance, wherein the first instance is provided using a second hardware interface to the first host and the second instance is provided using the management data input/output interface.

25. The network system of claim 24, wherein the physical layer device comprises a register interface and a physical layer circuit, the register interface being coupled to the physical layer circuit, the physical layer circuit comprising a set of registers, wherein the firmware is configured to execute an operation in one of the messages and write a result of the operation to at least one of the registers.

\* \* \* \* \*